United States Patent
Cho (10) Patent No.: US 11,541,937 B2
(45) Date of Patent: Jan. 3, 2023

(54) CLOSURE MODULE FRAME STRUCTURE OF VEHICLE

(71) Applicants: Hyundai Motor Company, Seoul (KR); Kia Corporation, Seoul (KR)

(72) Inventor: Ki Hyun Cho, Hwaseong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/373,013

(22) Filed: Jul. 12, 2021

(65) Prior Publication Data
US 2022/0204099 A1    Jun. 30, 2022

(30) Foreign Application Priority Data
Dec. 31, 2020  (KR) .................. 10-2020-0188617

(51) Int. Cl.
| | | |
|---|---|---|
| *B62D 24/00* | (2006.01) | |
| *B62D 33/077* | (2006.01) | |
| *B62D 33/08* | (2006.01) | |
| *B62D 27/02* | (2006.01) | |

(52) U.S. Cl.
CPC ............. *B62D 24/00* (2013.01); *B62D 27/02* (2013.01); *B62D 33/077* (2013.01); *B62D 33/08* (2013.01)

(58) Field of Classification Search
CPC ......... B62D 24/00; B62D 24/02; B62D 24/04
USPC ....... 296/26.08, 9, 193.04, 8, 203.01–203.04
See application file for complete search history.

(56) References Cited

U.S. PATENT DOCUMENTS 3,888,539 A * 6/1975 Niessner ................... B60P 3/34
                                                        296/156
6,138,783 A * 10/2000 Chene ..................... B62D 63/04
                                                         180/11

FOREIGN PATENT DOCUMENTS

CN      105151127 B   * 11/2017
KR      20090023758 A   3/2009

* cited by examiner

*Primary Examiner* — Dennis H Pedder
(74) *Attorney, Agent, or Firm* — Slater Matsil, LLP (57) ABSTRACT

An embodiment closure module frame structure of a vehicle includes a platform extending from a front to a rear of the vehicle to form an outer floor surface; a first and a second cabin frame provided on the platform such that the first and the second cabin frame are spaced apart from each other while facing each other; at least one middle connection part placed between the first and the second cabin frame; load path units that are in contact with the first and the second cabin frame, and are connected to opposite sides starting from the middle connection part; and a cabin unit inserted between the load path units to be fastened to the first and the second cabin frame.

20 Claims, 5 Drawing Sheets

[ SECT A-A ]

FIG 6A

[ SECT B-B ]

[ SECT B-B ]

CLOSURE MODULE FRAME STRUCTURE OF VEHICLE

CROSS-REFERENCE TO RELATED APPLICATIONS

This application claims priority to Korean Patent Application No. 10-2020-0188617, filed Dec. 31, 2020, which application is hereby incorporated herein by reference.

TECHNICAL FIELD

The present disclosure relates to a closure module frame structure of a vehicle and, more particularly, to a closure module frame structure of a vehicle, wherein the frame structure enables a cabin of a vehicle to be detachably attached to a frame so that various door parts can be assembled into a PBV vehicle, and the frame structure includes a load path structure configured to disperse collision energy.

BACKGROUND

There are several types of car doors. For example, there is a swing type mainly applied to sedans, a sliding type mainly applied to mid-sized vans, and a hatchback type mainly applied to the tail doors of vans and RV vehicles.

Meanwhile, a Purpose Built Vehicle (hereinafter, referred to as PBV) has emerged as a future mobility that extends living spaces. For example, when a PBV consisting of a shoe store and a PBV consisting of clothing store are docked on a hub, the hub becomes a shopping center. According to the purpose of the PBV, functions and designs can be extensively expanded. PBV is neither a public transport such as a bus, nor a private car, but a new type of mobility, and PBV is used as a flexible space where the purpose of the hub itself varies depending on the purpose of the PBV docked on the hub.

As such, for higher utilization of a PBV, a frame structure that is capable of changing the door type according to the purpose is required. For example, when there is a space limitation, such as a case where only passengers get off the PBV or the ceiling is low, it is necessary to apply a sliding type or an opposing type door. In contrast, when loading a large volume of luggage, it is necessary to apply a door type that widens an opening. Among the types of tail doors, a 'clamshell type' door that is split in the middle and divided up and down requires less force for opening than opening and closing a single large tail door, and takes up less space in the rear. The clamshell type door is in the limelight because the PBV opening can be widened when both an upper door and a lower door are opened.

Meanwhile, a frame structure of a normal car is configured such that when a car collision occurs, an impact load is concentrated on a specific part such as a side member. When the impact load is concentrated on the specific part of the frame, there is a risk of increasing damage to the vehicle and injury to the occupants, which is problematic.

The foregoing is intended merely to aid in the understanding of the background of the present disclosure, and is not intended to mean that the present disclosure falls within the purview of the related art that is already known to those skilled in the art.

SUMMARY

The present disclosure has been devised to solve the above problems, and the present disclosure provides a closure module frame structure of a vehicle that enables application of various closure modules and cabin units to a PBV.

In addition, the present disclosure provides a closure module frame structure of a vehicle that is capable of dispersing collision energy in a car collision by applying several load path units.

The objectives of the present disclosure are not limited to the objects mentioned above, and other objects of the present invention that are not mentioned can be understood by the following description, and can be more clearly understood by examples of the present disclosure. In addition, objects of the present disclosure can be realized by means described in the claims and combinations thereof.

In order to achieve the above objects, a closure module frame structure of a vehicle may include constitutions as follow.

According to an exemplary embodiment of the present invention, the closure module frame structure of the vehicle may include a platform extending from a front to a rear of the vehicle to form an outer floor surface; a first and a second cabin frame provided on the platform such that the first and the second cabin frame are spaced apart from each other while facing each other; at least one middle connection part placed between the first and the second cabin frame; load path units that are in contact with the first and the second cabin frame, and are connected to opposite sides starting from the middle connection part; and a cabin unit inserted between the load path units to be fastened to the first and the second cabin frame.

In addition, in the closure module frame structure of the vehicle, the middle connection part may be formed in an integrated manner with at least one of the first and the second cabin frame.

In addition, in the closure module frame structure of the vehicle, the middle connection part may be formed in an integrated manner with the load path units.

In addition, in the closure module frame structure of the vehicle, at least one of the first and the second cabin frame may further include a groove configured to accommodate the middle connection part therein.

In addition, in the closure module frame structure of the vehicle, the cabin unit may include at least one load path coupling part inserted between the load path units, and a cabin space part connected to the first or second cabin frame.

In addition, the closure module frame structure of the vehicle may further include a guide rail extending from opposite sides of an outside of the platform, and a cabin guide part formed in the cabin space part at a location corresponding to the guide rail and engaged with the guide rail.

In addition, the closure module frame structure of the vehicle may further include a fixing unit fixing the cabin unit to the load path units.

In addition, in the closure module frame structure of the vehicle, the fixing unit may include a hook supporting part inserted into the load path units, a hook formed on the load path units at a location corresponding to the hook supporting part, and a hook insertion groove located on the load path coupling part and formed to fix the load path coupling part by receiving the hook therein.

In addition, the closure module frame structure of the vehicle may further include a mounting bolt penetrating both the guide rail and the cabin guide part.

In addition, in the closure module frame structure of the vehicle, when the load path coupling part and the load path units are coupled, the hook may be interference-fitted to the hook supporting part.

In addition, in the closure module frame structure of the vehicle, when the load path coupling part is released from the load path units, the hook supporting part may be released from the hook.

In addition, the closure module frame structure of the vehicle may further include a door part located between the first and the second cabin frame.

The present disclosure can realize various effects as follows by the combination of the present embodiment and a configuration to be described hereinafter, and a use relationship.

The frame structure can be used according to the purpose since various closure modules and cabin units can be applied to PBVs.

In addition, it is possible to disperse collision energy in the event of a car collision by applying several load path units, thereby reducing the damage to the vehicle and ensuring the safety of passengers.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF ILLUSTRATIVE EMBODIMENTS

Hereinbelow, exemplary embodiments of the present disclosure will be described in detail with reference to the accompanying drawings. It should be understood that the exemplary embodiment of the present disclosure may be changed to a variety of embodiments and the scope and spirit of the present disclosure are not limited to the embodiments described hereinbelow. The embodiment of the present disclosure described hereinbelow is provided for allowing those skilled in the art to more clearly comprehend the present disclosure.

In addition, terms such as " . . . part" and " . . . unit" in this disclosure may represent a unit that processing at least one function or operation, and may be implemented as a combination of hardware.

In addition, terms such as 'a first ~' and 'a second ~' in this disclosure are only used to distinguish between components with the same term. Accordingly, in the following description, the terms are not necessarily limited to the order.

In addition, the terms "front" and "rear" in this disclosure are based on the driving direction of the vehicle.

In addition, in this disclosure, the term "longitudinal direction" refers to a direction extending from the front to the rear with respect to the vehicle, and "height direction" refers to a direction with respect to the vehicle.

In addition, when any part is referred to as being positioned "on" another part, it means the part is "directly on" another part or above the other part disposed therebetween.

In addition, when any part is referred to as being positioned "below" another part, it means the part is "directly below" another part or under the other part disposed therebetween.

Figure 1:
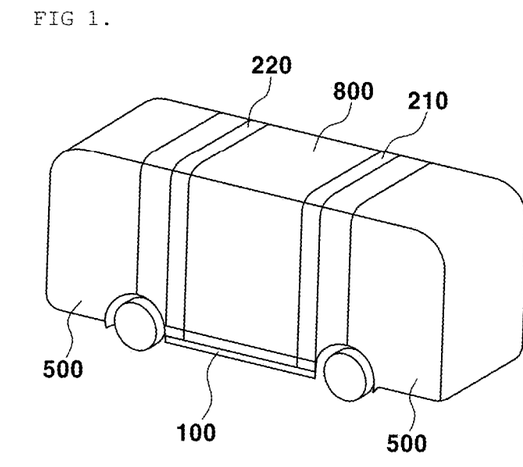
FIG. 1 is a perspective view of a PBV to which a closure module frame structure of a vehicle is applied according to an exemplary embodiment of the present disclosure.

FIG. 1 is a perspective view of a PBV to which a closure module frame structure of a vehicle is applied according to an exemplary embodiment of the present disclosure.

According to FIG. 1, the closure module frame structure of the vehicle may include a platform 100 forming an outer bottom surface, a first cabin frame 210 and a second cabin frame 220 located on the platform 100, according to an exemplary embodiment of the present disclosure. The present disclosure may be applied to the PBV, and may have a structure in which a door part 800 is opened and closed at the side of the vehicle.

The platform 100 may form an outer floor surface by extending from a front of the vehicle to a rear. The first and the second cabin frame 210 and 220 may be placed apart to face each other on the platform 100. As an embodiment of the present disclosure, the first and the second cabin frame 210 and 220 may have a symmetrical structure to face each other with respect to the center of the platform 100. The first cabin frame 210 may be located at a front side and the second cabin frame 220 may be located at a rear side. The first cabin frame 210 and the second cabin frame 220 may have the same "□" shape.

Figure 2:
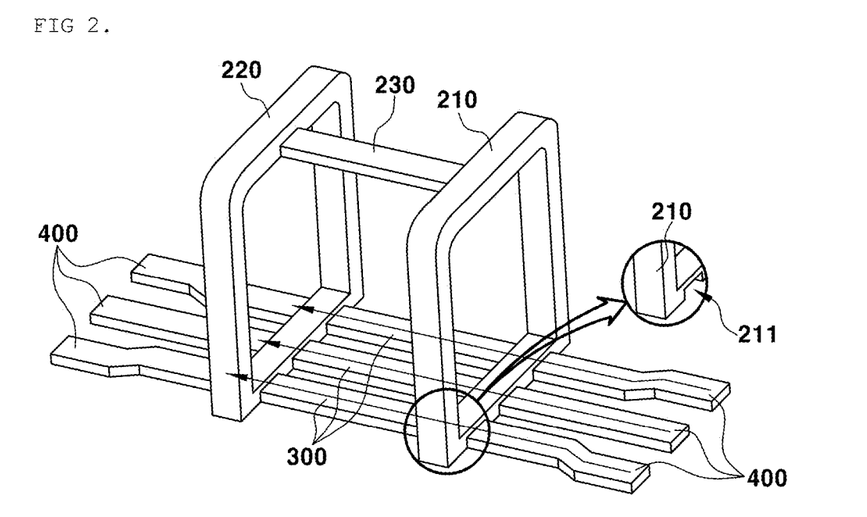
FIG. 2 is a view showing perspective view of the closure module frame structure of the vehicle, and a load path section showing transmission of a collision energy according to an embodiment of the present disclosure.

According to FIG. 2, at least one door frame 230 may be formed between an upper side of the first cabin frame 210 and an upper side of the second cabin frame 220. As an embodiment of the present disclosure, the first and the second cabin frame 210 and 220 may be connected by at least one door frame 230. As another embodiment of the present disclosure, the first and the second cabin frame 210 and 220 may be formed in an integrated manner with at least one door frame 230.

The present disclosure may further include the door part 800 positioned between the first and the second cabin frame 210 and 220. The door part 800 may be a clamshell type in which an upper door and a lower door are divided, or an opposing type that is rotatably opened to opposite sides, or a sliding type door part 800, but the present disclosure is not particularly limited thereto. As an embodiment of the present disclosure, the door part 800 may be hinged to the door frame 230 to be rotatably opened. Depending on the door part 800, a separation distance or shape of the first and the second cabin frames 210 and 220 may be changed.

A cabin unit 500 may be fastened to the first cabin frame 210 and the second cabin frame 220. FIG. 1 shows the states of the first cabin frame 210 and the second cabin frame 220 to which the cabin unit 500 is fastened and the door part 800 is mounted. The first cabin frame 210, the second cabin frame 220, the cabin unit 500, and the door part 800 may be located on the platform 100 to form the outer circumferential surface of the PBV vehicle.

FIG. 2 is a view showing perspective view of the closure module frame structure of the vehicle, and a load path section showing transmission of a collision energy according to an embodiment of the present disclosure.

According to FIG. 2, in the closure module frame structure of the vehicle, at least one middle connection part 300 and load path unit 400 may be connected from the front to the rear, according to an exemplary embodiment of the present disclosure.

The middle connection part 300 may be located between the first cabin frame 210 and the second cabin frame 220. The first cabin frame 210 and the second cabin frame 220 may be located on the platform 100. The middle connection part 300 may be located on the upper side of the platform 100 between one end of the first cabin frame 210 and one end of the second cabin frame 220. Preferably, at least one middle connection parts 300 may be formed with a certain distance in the width direction of the vehicle. The middle connection part 300 and lower ends of the first cabin frame 210 and the second cabin frame 220 may be bolted to each other. As an embodiment of the present disclosure, according to FIG. 2, three middle connection parts 300 may be spaced apart at regular intervals, and may be formed to extend in the longitudinal direction by a distance between the first and the second cabin frames 210 and 220. As another embodiment of the present disclosure, the middle connection part 300 may be formed in an integrated manner with at least one of the first and the second cabin frames 210 and 220.

The load path unit 400 may be formed in contact with the first and the second cabin frames 210 and 220. Preferably, the load path unit 400 may contact the other end of the first cabin frame 210 and the other end of the second cabin frame 220 respectively. The load path unit 400 is adjacent to the middle connection part 300 and may extend from the other ends of the first and the second cabin frame 210 and 220 to the end of the platform 100 respectively. At least one of the load path units 400 may be formed to correspond to the middle connection part 300. Multiple load path units 400 may extend in the longitudinal direction in contact with the first and second cabin frames 210 and 220 at positions corresponding to the middle connection part 300. The load path unit 400 may be bolted to the first cabin frame 210 and the second cabin frame 220.

As an embodiment of the present disclosure, three load path units 400 may be spaced apart to correspond to the distance to the middle connection part 300, and may be formed to extend to both ends of the platform 100 in a longitudinal direction. The three load path units 400 may have the same shape as the middle connection part 300. As another embodiment of the present disclosure, the load path unit 400 adjacent to a wheel of the vehicle may extend to the end of the platform 100 and is tapered in the width direction in a certain area.

As another embodiment of the present disclosure, the middle connection part 300 may be formed in an integrated manner with the load path unit 400. In this case, at least one of the first cabin frame 210 and the second cabin frame 220 may be provided with a groove 211 capable of accommodating the middle connection part 300. The groove may be formed to accommodate the middle connection part 300. Accordingly, at least one middle connection unit 300 and at least one load path unit 400 may be configured in an integrated manner from the front to the rear of the vehicle.

A load path may be formed wherein when forward collision occurs, the collision load transmitted to the load path unit 400 in front is transmitted to a connection part with the first cabin frame 210, and the transmitted collision load passes through the middle connection part 300 and is transmitted to the second cabin frame 220 and to the load path unit 400 in back. Likewise, a load path may be formed wherein when backup collision occurs, the collision load transmitted to the load path unit 400 in back is transmitted to a connection part with the second cabin frame 220, and the transmitted collision load passes through the middle connection part 300 and is transmitted to the first cabin frame 210 and to the load path unit 400 in front. The middle connection part 300 and the load path unit 400 may be formed with a plurality of each part to have a multi-load path structure that is configured to disperse collision energy to multiple paths when a collision occurs.

Figure 3:
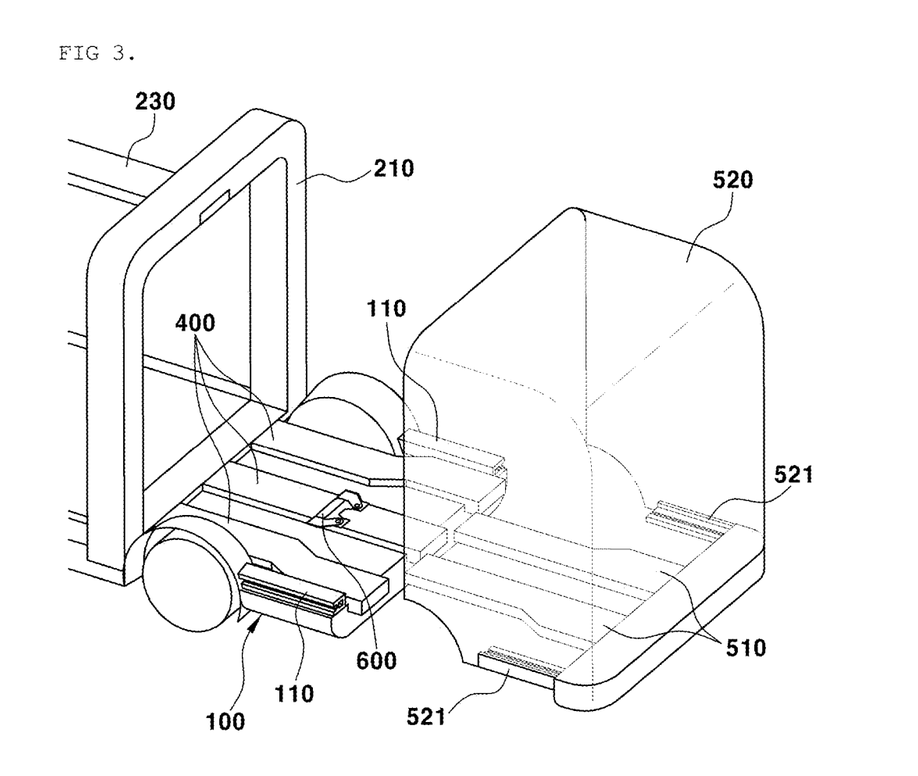
FIG. 3 is a perspective view showing a case in which a cabin unit is coupled to load path units of the closure module frame structure of the vehicle according to an exemplary embodiment of the present disclosure.
Figure 4:
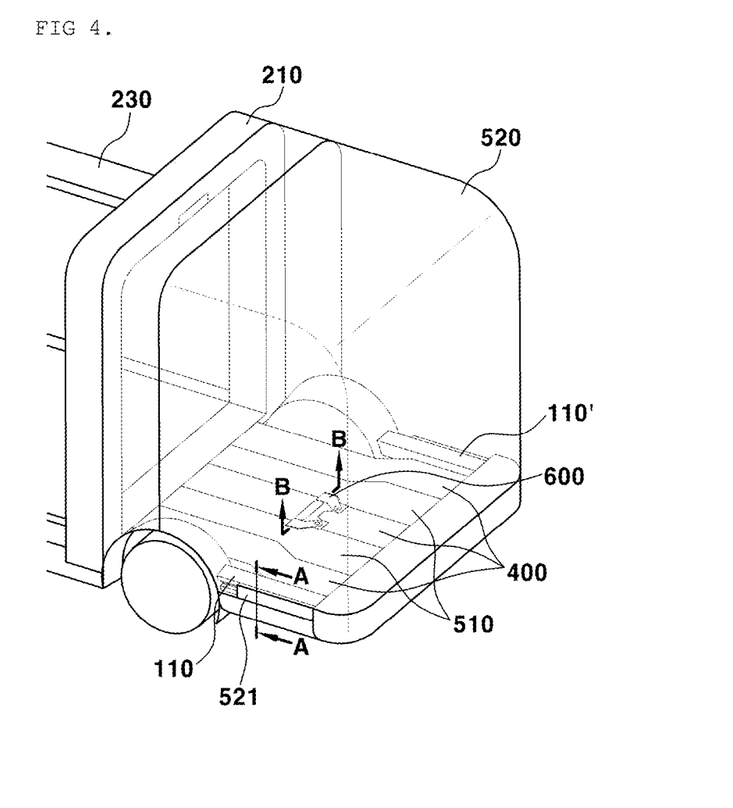
FIG. 4 is a perspective view showing a state in which the cabin unit is coupled to the load path units and a first cabin frame of the closure module frame structure of the vehicle according to an embodiment of the present disclosure.

FIG. 3 is a perspective view showing a case in which a cabin unit 500 is coupled to the load path units 400 of the closure module frame structure of the vehicle according to an exemplary embodiment of the present disclosure; and FIG. 4 is a perspective view showing a state in which the cabin unit 500 is coupled to the load path units 400 and the first cabin frame 210 of the closure module frame structure of the vehicle according to an embodiment of the present disclosure.

According to FIGS. 3 and 4, the cabin unit 500 may be inserted between at least one load path units 400. Preferably, the cabin unit 500 may include at least one load path coupling part 510 and a cabin space part 520. The cabin unit 500 may be located on opposite sides with respect to the middle connection part 300.

The load path coupling part 510 may be inserted between at least one load path units 400. As an embodiment of the present disclosure, according to FIG. 3, the two load path coupling parts 510 may be inserted between the three load path units 400. A shape of the load path coupling part 510 may correspond to a shape of the load path unit 400 so that the cabin unit 500 may be assembled without interference.

The cabin space part 520 may be connected to the first cabin frame 210 or the second cabin frame 220. When the cabin unit 500 is assembled in the vehicle, the cabin space part 520 may form the outermost surface of the vehicle interior space. In addition, according to FIG. 4, the load path unit 400 and the load path coupling part 510 may be configured to form the same plane.

Meanwhile, the present disclosure may further include a guide rail no on the platform wo side and a cabin guide part 521 on the cabin space part 520 side to assemble the cabin unit 500. The guide rail may be formed extending from opposite sides of the outside of the platform 100. Preferably, the guide rail no may extend in the longitudinal direction from the end of the platform 100 to a portion adjacent to the wheel and wheel well. The cabin guide part 521 may be formed at a position corresponding to the guide rail 110 at both lower ends of the cabin space part 520. When the cabin unit 500 is assembled, the cabin guide part 521 is engaged with the guide rail no.

The present disclosure may further include a fixing unit 600 for fixing the cabin unit 500 to the load path unit 400. Preferably, after the load path coupling part 510 is completely inserted between the load path units 400, the fixing unit 600 fixes the load path coupling part 510 to the load path unit 400. After the fixing unit 600 is released, the load path coupling part 510 is released from the load path unit 400.

Figure 5:
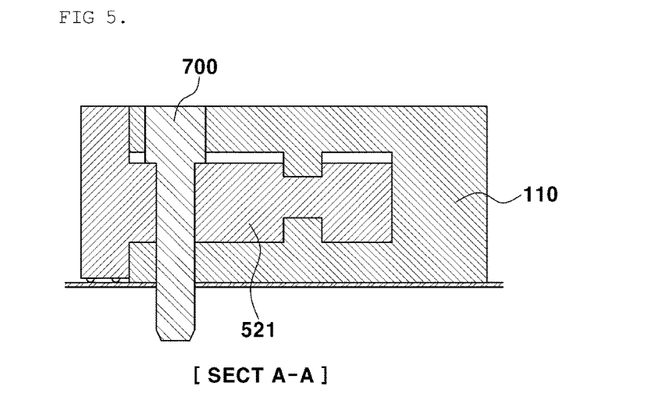
FIG. 5 is a cross-sectional view showing a guide rail and a cabin guide part of the closure module frame structure of the vehicle according to an exemplary embodiment of the present disclosure.

FIG. 5 is a cross-sectional view showing the guide rail no and the cabin guide part 521 of the closure module frame structure of the vehicle according to an exemplary embodiment of the present disclosure.

According to FIG. 5, shapes of an inner circumferential surface of the guide rail no and an outer circumferential surface of the cabin guide part 521 may be configured to correspond to each other. When the cabin unit 500 is assembled, the cabin guide part 521 is engaged with the guide rail no to limit the amount of movement of the cabin unit 500 in the left and right directions.

The closure module frame structure of the vehicle may further include a mounting bolt 700 entirely penetrating the guide rail no and the cabin guide part 521, according to an exemplary embodiment of the present disclosure. The mounting bolt 700 may be fastened to the upper surface of the guide rail no in the height direction. When the mounting bolt 700 is fastened, a base side of the cabin guide part 521 may contact a base side of the guide rail no. As an embodiment of the present disclosure, when the mounting bolt 700 is fastened, the cabin guide part 521 is pressed and attached to the sealing part of the guide rail no. This may allow a limitation of the amount of movement with the height direction of the cabin unit 500.

Figure 6A:
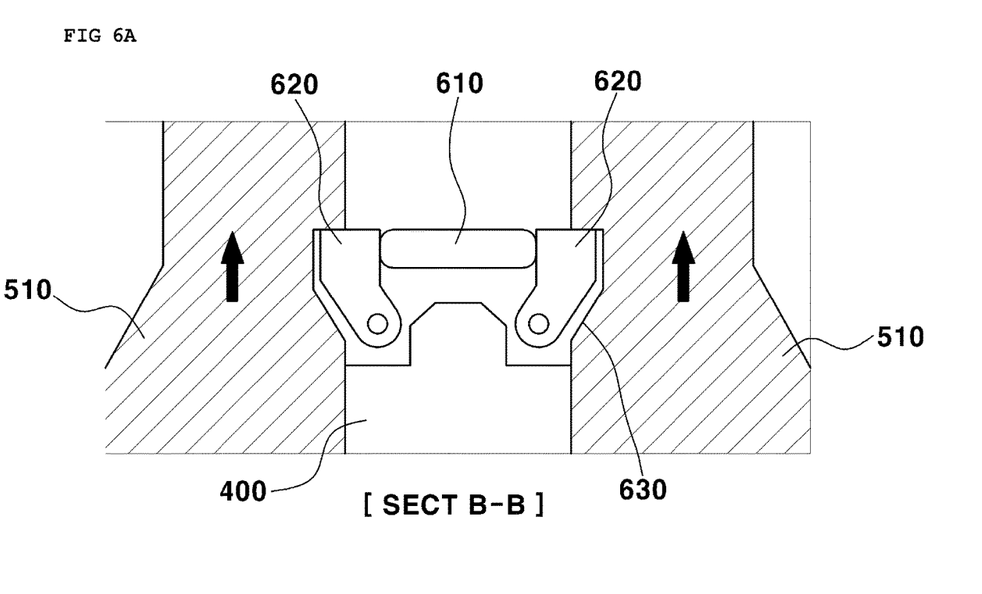
FIG. 6A is a cross-sectional view of a fixing unit in a state in which a load path coupling part of the closure module frame structure of the vehicle is coupled to the load path units according to an exemplary embodiment of the present disclosure.

FIG. 6A is a cross-sectional view of the fixing unit 600 in a state in which the load path coupling part 510 of the closure module frame structure of the vehicle is coupled to the load path unit 400 according to an exemplary embodiment of the present disclosure.

According to FIG. 6A, the fixing unit 600 may include a hook supporting part 610, a hook 620, and a hook insertion groove 630. The hook supporting part 610 may be inserted into at least one of the load path units 400. The hook support 610 may be formed to fix the load path coupling part 510. Preferably, a groove is formed in at least one of the load path units 400 so that the hook supporting part 610 may be fitted in the height direction. As an embodiment of the present disclosure, a covering is formed in a position corresponding to the groove of the load path unit 400, and when the hook supporting part 610 is released, the groove is covered by the covering. The cabin unit 500 may be selectively fixed and be detachable by the fixing unit 600.

The hook 620 may be formed on the load path unit 400 at a position corresponding to the hook supporting part 610. Preferably, the hook 620 may be configured such that one end thereof is fixed to the load path unit 400 and the other end thereof is rotated. The hook 620 may be formed in a pair that fixes both ends of the hook supporting part 610. As an embodiment of the present disclosure, when the load path coupling part 510 and the load path unit 400 are coupled, the hook 620 is interference-fitted to the hook supporting part 610. When the load path coupling part 510 is completely inserted between the load path units 400, the hook supporting part 610 is inserted so that the hooks 620 are spaced apart. After the cabin unit 500 is assembled, floor coverings may be formed on an upper surface of the middle connection part 300, an upper surface of the load path unit 400, and the load path coupling part 510.

The hook insertion groove 630 is positioned in the load path coupling part 510, and may be formed such that the hook 620 is inserted so that the load path coupling part 510 is fixed. Preferably, the hook insertion grooves 630 limit the amount of rotation of the hooks 620 when the hooks 620 are spaced apart by inserting the hook supporting part 610. The hook insertion groove 630 may be formed in each of the load path coupling parts 510 spaced apart in a shape corresponding to the hook 620. The hook insertion groove 630 is formed at a position corresponding to the hook 620 in a longitudinal direction, when the load path coupling part 510 is completely inserted between the load path units 400.

Figure 6B:
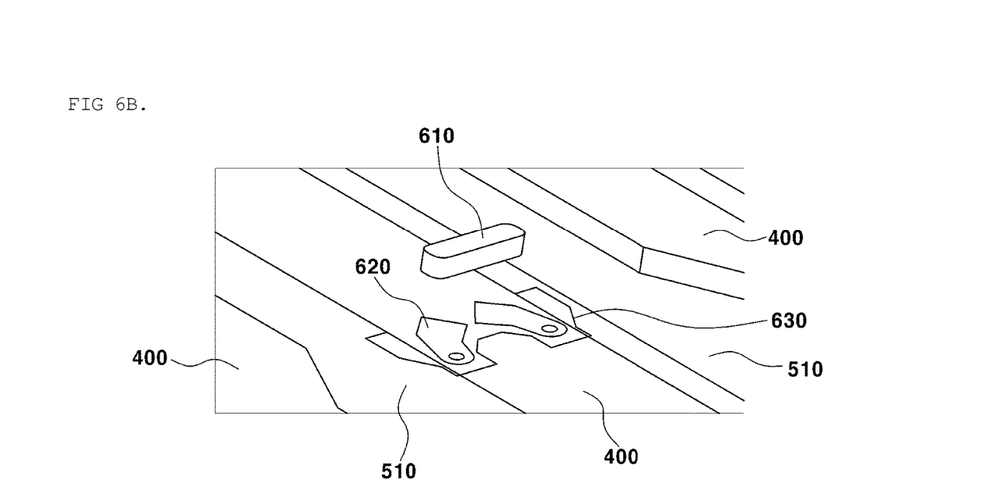
FIG. 6B is a view showing a hook supporting part of the closure module frame structure of the vehicle to be released from a hook according to an exemplary embodiment of the present disclosure.
Figure 6C:
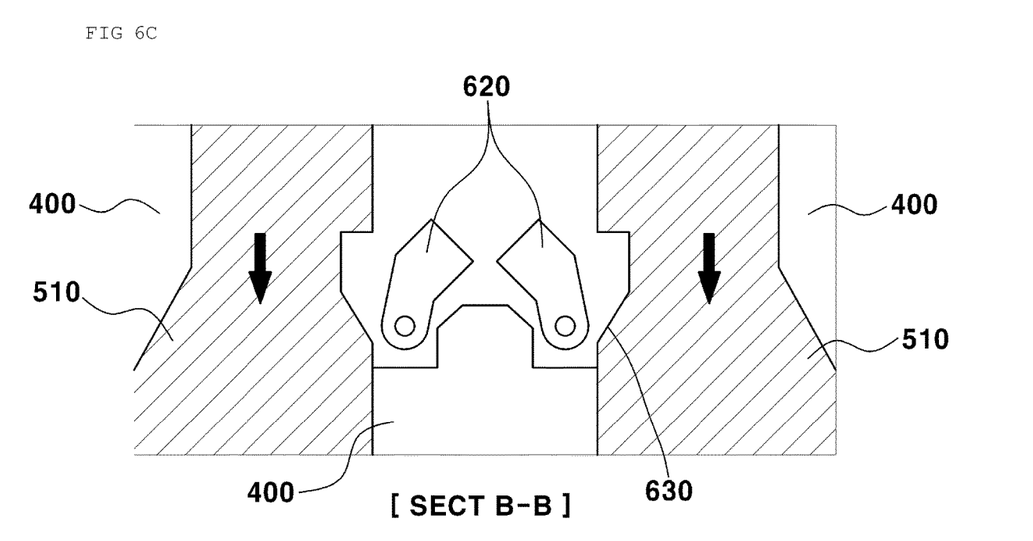
FIG. 6C is a cross-sectional view of the fixing unit in case of the load path coupling part of the vehicle closure module frame structure of the vehicle to be released from the load path units according to an exemplary embodiment of the present disclosure.

FIG. 6B is a view showing the hook supporting part 610 of the closure module frame structure of the vehicle to be released from a hook 620 according to an exemplary embodiment of the present disclosure; and FIG. 6C is a cross-sectional view of the fixing unit 600 in case of the load path coupling part 510 of the vehicle closure module frame structure of the vehicle to be released from the load path unit 400 according to an exemplary embodiment of the present disclosure.

According to FIGS. 6B and 6C, when the load path coupling part 510 is released from the load path unit 400, the hook supporting part 610 is released from the hook 620. Preferably, when the hook supporting part 610 is released from the hook 620, the hook 620 is restored and the hook 620 is released from the hook insertion groove 630. When the hook 620 is released from the hook insertion groove 630, the load path coupling part 510 is released from the load path unit 400.

As an embodiment of the present disclosure, when the hook supporting part 610 is released, the hook 620 is restored so that the load path coupling part 510 is released without interference from the load path unit 400. One end of the hook 620 may be hinged to the load path unit 400 by an elastic member. When the hook supporting part 610 is interference-fitted with the hook 620, the hook supporting part 610 is fixed by an elastic repulsive force. When the hook supporting part 610 is released from the hook 620, the hook 620 may be restored to its original state by an elastic restoring force.

The cabin unit 500 may be stably assembled to the vehicle by a guide rail no, a cabin guide part 521, and the fixing unit 600. Preferably, the side surface of the cabin unit 500 may be fixed by the guide rail no and the cabin guide part 521, and the middle part of the cabin unit 500 may be fixed by the fixing unit 600. When replacement of the cabin unit 500 is required, the mounting bolt 700 is released and the hook supporting part 610 is removed. When the mounting bolt 700 and the hook supporting part 610 are released, the cabin unit 500 is released in a direction opposite to the direction inserted into the load path units 400.

In summary, the present disclosure provides the closure module frame structure of the vehicle, wherein the frame structure enables the cabin unit 500 to be detachably attached to a frame so that various door parts 800 can be assembled into a PBV vehicle, and includes a load path structure configured to disperse collision energy.

The above detailed description embodies the present disclosure. In addition, the above description shows and describes preferred embodiments of the present disclosure, and the present disclosure can be used in various other combinations, modifications, and environments. That is, the present disclosure can be changed or modified within a range of a concept of the disclosure described herein, an equivalent range of the described content, and/or within a range of skills or knowledge in a relevant industry. The described embodiment describes the best state for implementing the technical idea of the present disclosure, and various modifications required in the specific application fields and uses of the present disclosure are also possible. Therefore, the detailed description of the disclosure is not intended to limit the present disclosure in a state of the described embodiment. In addition, the accompanying claims should be interpreted as including other embodiments.

What is claimed is:

1. A closure module frame structure of a vehicle, the closure module frame structure comprising:
    a platform extending from a front to a rear of the vehicle to form an outer floor surface;
    a first and a second cabin frame provided on the platform such that the first and the second cabin frame are spaced apart from each other while facing each other;
    at least one middle connection part placed between the first and the second cabin frame;
    load path units that are in contact with the first and the second cabin frame, and are connected to opposite sides starting from the middle connection part; and
    a cabin unit inserted between the load path units and detachably fastened to the first and the second cabin frame.

2. The closure module frame structure of claim 1, wherein the middle connection part is formed in an integrated manner with at least one of the first and the second cabin frame.

3. The closure module frame structure of claim 1, wherein the middle connection part is formed in an integrated manner with the load path units.

4. The closure module frame structure of claim 3, wherein at least one of the first and the second cabin frame further comprises a groove configured to accommodate the middle connection part therein.

5. The closure module frame structure of claim 1, wherein the cabin unit comprises:
    at least one load path coupling part inserted between the load path units; and
    a cabin space part connected to the first or second cabin frame.

6. The closure module frame structure of claim 5, further comprising:
    a guide rail extending from opposite sides of an outside of the platform; and
    a cabin guide part formed in the cabin space part at a location corresponding to the guide rail and engaged with the guide rail.

7. The closure module frame structure of claim 5, further comprising a fixing unit fixing the cabin unit to the load path units.

8. The closure module frame structure of claim 7, wherein the fixing unit comprises:
    a hook supporting part inserted into the load path units;
    a hook formed on the load path units at a location corresponding to the hook supporting part; and
    a hook insertion groove located on the load path coupling part and formed to fix the load path coupling part by receiving the hook therein.

9. The closure module frame structure of claim 6, further comprising a mounting bolt penetrating both the guide rail and the cabin guide part.

10. The closure module frame structure of claim 8, wherein when the load path coupling part and the load path units are coupled, the hook is interference-fitted to the hook supporting part.

11. The closure module frame structure of claim 8, wherein when the load path coupling part is released from the load path units, the hook supporting part is released from the hook.

12. The closure module frame structure of claim 1, further comprising a door part located between the first and the second cabin frame.

13. A purpose built vehicle comprising:
    a closure module frame structure comprising:
        a platform extending from a front to a rear of the purpose built vehicle to form an outer floor surface;
        a first and a second cabin frame provided on the platform such that the first and the second cabin frame are spaced apart from each other while facing each other;
        at least one middle connection part placed between the first and the second cabin frame;
        load path units that are in contact with the first and the second cabin frame, and are connected to opposite sides starting from the middle connection part; and
        a cabin unit inserted between the load path units and detachably fastened to the first and the second cabin frame; and
    a set of wheels disposed in respective wheel wells, wherein each wheel well is adjacent a respective one of the load path units.

14. The purpose built vehicle of claim 13, wherein the middle connection part is formed in an integrated manner with at least one of the first and the second cabin frame.

15. The purpose built vehicle of claim 13, wherein the middle connection part is formed in an integrated manner with the load path units.

16. The purpose built vehicle of claim 15, wherein at least one of the first and the second cabin frame further comprises a groove configured to accommodate the middle connection part therein.

17. The purpose built vehicle of claim 13, wherein the cabin unit comprises:
    at least one load path coupling part inserted between the load path units; and
    a cabin space part connected to the first or second cabin frame.

18. The purpose built vehicle of claim 17, wherein the closure module frame structure further comprises:
    a guide rail extending from opposite sides of an outside of the platform; and
    a cabin guide part formed in the cabin space part at a location corresponding to the guide rail and engaged with the guide rail.

19. The purpose built vehicle of claim 17, wherein the closure module frame structure further comprises a fixing unit fixing the cabin unit to the load path units.

20. The purpose built vehicle of claim 13, wherein the closure module frame structure further comprises a door part located between the first and the second cabin frame.

* * * * *